F. W. KROGH.
THRUST BEARING.
APPLICATION FILED AUG. 30, 1915.

1,243,429.

Patented Oct. 16, 1917.
3 SHEETS—SHEET 1.

WITNESSES.
O. Poulsen
R. M. Wolfe

INVENTOR.
F. W. Krogh.
per A. S. Paré
ATTORNEY.

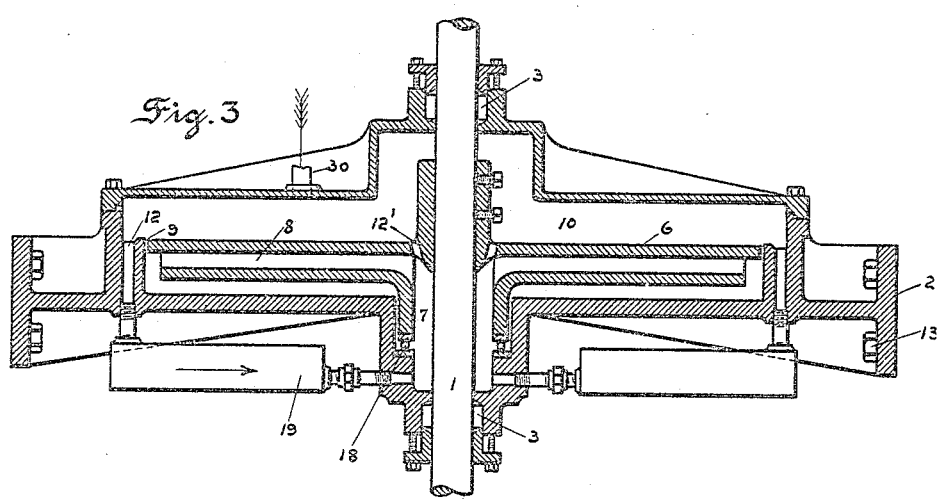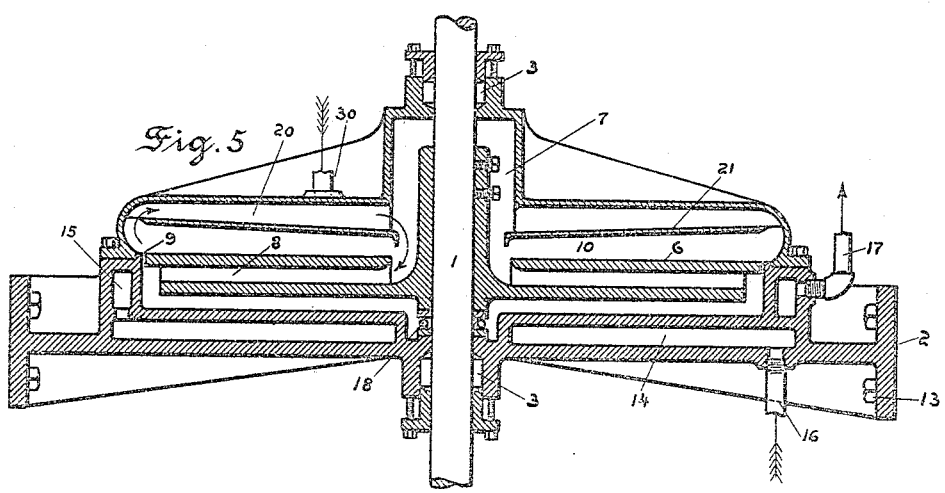

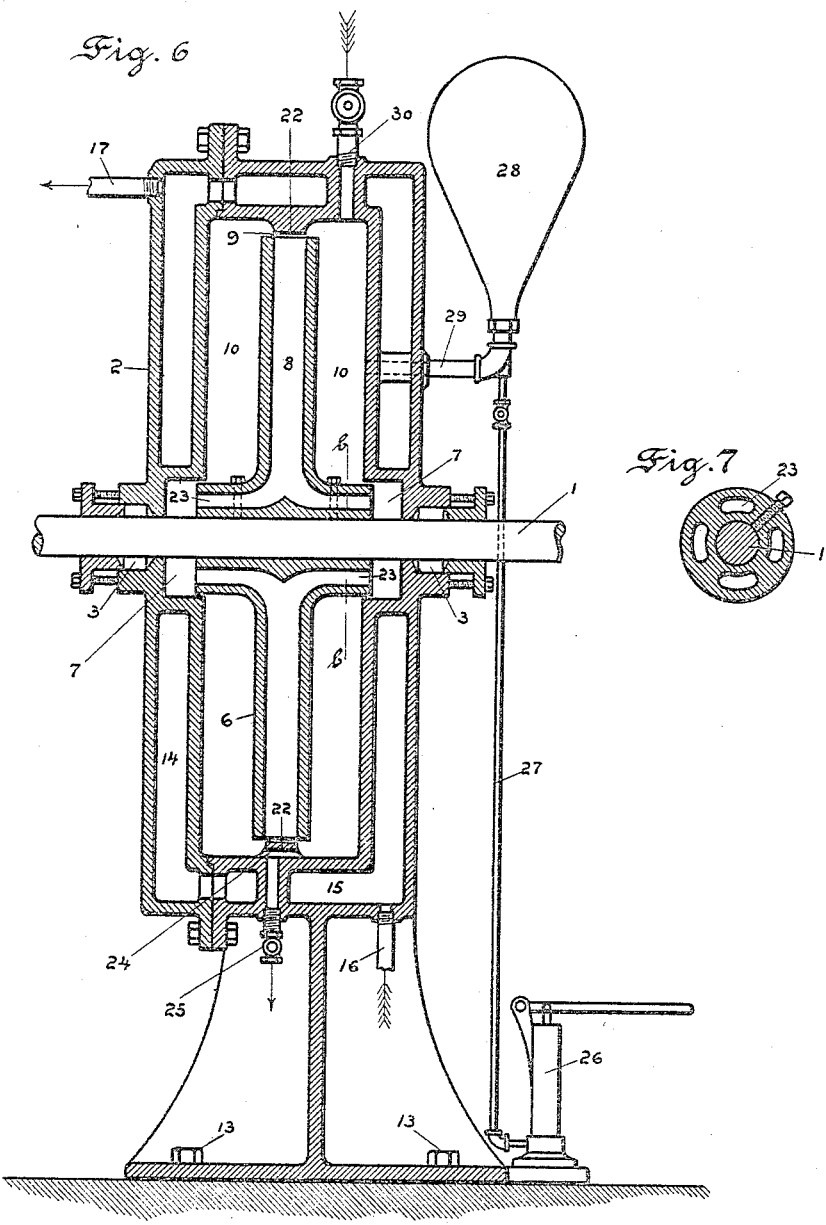

UNITED STATES PATENT OFFICE.

FERDINAND W. KROGH, OF SAN FRANCISCO, CALIFORNIA.

THRUST-BEARING.

1,243,429.  Specification of Letters Patent.  Patented Oct. 16, 1917.

Application filed August 30, 1915. Serial No. 47,979.

*To all whom it may concern:*

Be it known that I, FERDINAND W. KROGH, of San Francisco, California, have invented certain new and useful Improvements in Thrust-Bearings, whereof the following is a specification.

This invention relates to thrust bearings for shafts, such as the shafts of centrifugal pumps, screw propellers and other shafts which have to resist an end strain.

The object of the invention is to use the resisting power of a liquid, such as oil or other liquid, to take up the thrust. A further object is to provide mechanism for efficiently making use of such liquid.

In carrying out the invention I provide a casing which surrounds the shaft at a convenient point. Within this casing I locate a runner, attached to the shaft and rotating with it, which shaft and runner, runs in the oil or other liquid which is placed in the casing and, by centrifugal force, throws the liquid to the periphery of the casing causing it to exert a pressure upon one side or the other of the runner and thus maintains it and the shaft in their required position.

In the accompanying three sheets of drawing I have illustrated a mechanism containing my invention, as adapted more particularly for use with oil as the resisting liquid.

In these drawings:—

Fig. 3 is a section, similar to Fig. 1, and showing in addition thereto an air cooling method for the oil.

Fig. 4 is an end view of the air cooling drum, shown in Fig. 3.

Fig. 5 is a similar section to Fig. 1 but showing a modification of the means for returning the oil from the periphery to the center of the casing.

Fig. 6 is an axial section, similar to Fig. 1, showing the invention as more particularly adapted to a horizontal shaft, instead of to a vertical shaft, as it is shown in the other figures.

Fig. 7 is a cross section taken at the line *b*, *b*, of Fig. 6, and showing the shaft and hub of the runner. In these figures:—

1 is the shaft for which a thrust bearing is to be provided. 2 is a casing surrounding the shaft at a convenient point and provided with stuffing boxes, 3. In case of a vertical shaft the upper stuffing box may be recessed as at 4, Fig. 1 and so provide a receptacle for oil which may be delivered to it by a pipe, 5, from the interior of the casing, the oil being forced through the pipe by centrifugal force. 6 is a runner mounted upon the shaft, 1, and rotating with it and contained within the casing, 2, which is shaped to receive it. This runner may be of any desired construction and is provided with a central reservoir, 7, which may be partly in the runner and partly in the casing or wholly in either one, as desired. Leading from the central reservoir are radial channels, 8.

The runner being rotated by the shaft, the oil, with which the casing is filled, is thrown outward by centrifugal force, and exerts a pressure upon the sides of the runner, which pressure will vary with the speed of rotation of the shaft and runner and will thus serve to balance the thrust of the shaft.

Figure 1:
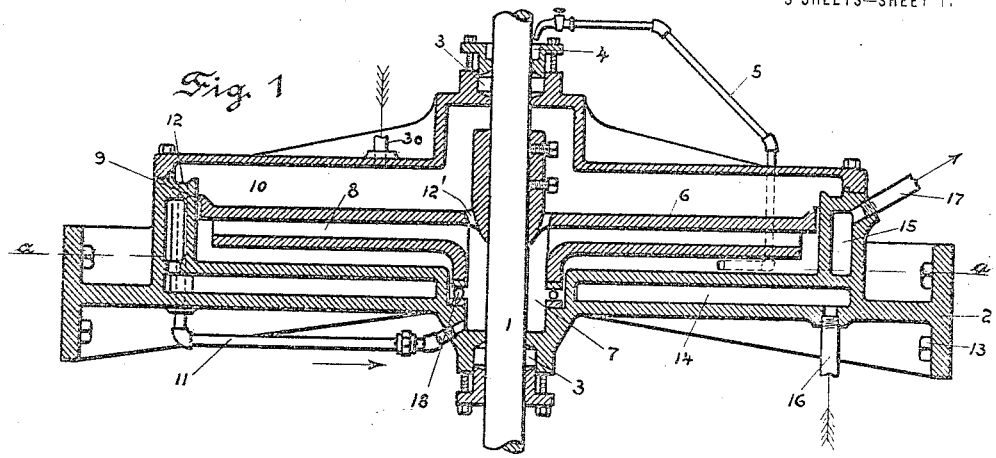
Figure 1 is an axial section showing the shaft, the runner thereon, the casing about the runner and a water jacket applied to the casing, and other details.
Figure 2:
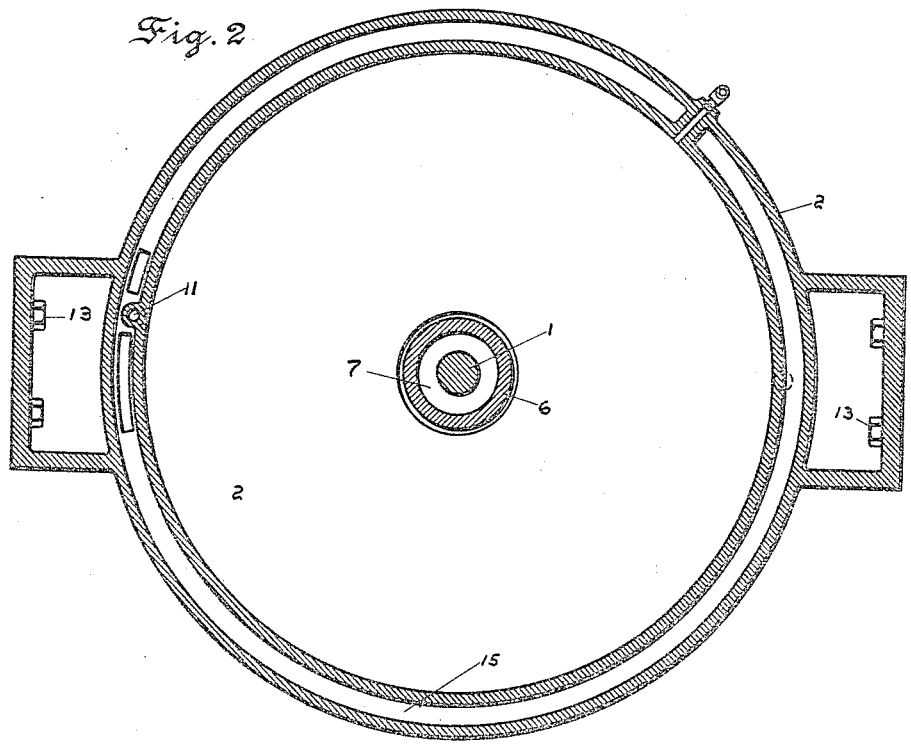
Fig. 2 is a section taken upon the line *a*, *a*, of Fig. 1.

The oil that is thrown outward by centrifugal force finds its way through the joints, 9, between the edge of the runner and the inner surface of the casing, and passing through these joints, enters the space 10. From this space 10, an oil pipe 11, leads from ports 12, to the central reservoir, 7, and the oil that is thrown outward by centrifugal force finds its way back through the pipe 11 to the central reservoir as shown in Fig. 1. In case there is a surplusage of oil, more than the pipe, 11, can convey, which may occur if the shaft is rotating very rapidly, the surplus will be driven back toward the central reservoir through the space 10, then through the channels 12', in the hub of the runner.

The casing may be secured to any fixed point by means of the flanges and bolts at 13.

Inasmuch as the rotation of the runner and its action upon the oil have a heating effect, I provide a water jacket in the casing consisting of the spaces and channels 14 and 15. 16 and 17 are respectively inlet and outlet pipes for the water supply to said jacket.

At 18, I have shown ball bearings for the runner to revolve on when the movement is very slow, as shown in Figs. 1, 3 and 5.

In some cases it may be found desirable to dispense with the water jacket and cool the heated oil by radiation into the atmosphere. In this case the pipe 11, may be expanded into a flattened conduit as seen at 19 in Figs. 3 and 4.

In some cases it may be found desirable to omit the return pipe 11, altogether, and, in lieu thereof, provide a return channel in the upper part of the casing. I have shown such channel at 20 in Fig. 5. The oil which is thrown outward by the runner passes around the outer edge of the diaphragm, 21, into the space 20, where it flows toward the central reservoir 7.

In Figs. 6 and 7, I have shown the invention as adapted for a horizontal shaft. I have also shown in these figures oil spaces on both sides of the runner and central chambers at each end of the hub of the runner with channels in said hub leading from said chambers to the radial channels. Upon the inner circumference of the casing and immediately opposite the ends of the radial channels, 8, I provide a flange 22. This flange is of such size that it nearly blocks the circumferential outlets of the radial channels, 8, but the slightest movement of the runner in a direction axial of the shaft will open the joint between the runner and the flange 22, and permit a freer outflow of oil on that side, which will increase the pressure on that side and return the shaft and runner to their normal position. The oil which is thrown outward by the runner returns at its sides through the spaces 10, into the central reservoirs 7, and thence through the axial channels 23, into the radial channel 8, again. At the bottom of the casing the flange 22, is perforated in an axial direction as shown at 24, so that the casing may be drained, through the drain pipe 25.

26 is an air pump communicating by pipe 27, with the air chamber 28, which in turn communicates through the pipe 29, with the interior of the casing. Thus any desired pressure may be produced within the casing by operating the pump 26.

30, in all the figures, is a filling pipe for filling the casing with oil or other liquid.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to wit:—

1. A thrust bearing comprising a casing and a runner rotating therein, said casing adapted to contain a liquid, and means for returning the liquid from the inner surface to the center of the casing.

2. A thrust bearing comprising a casing and a runner rotating therein, said casing being provided with a chamber adapted to contain a liquid, and means to form an air cushion in said chamber.

3. A thrust bearing comprising a shaft, a casing about the shaft adapted to contain a liquid, a runner within the casing and means for accommodating the return movement of the liquid.

4. A thrust bearing comprising a shaft, a casing about the same adapted to contain a liquid, a runner within the casing and liquid, adapted to rotate with the shaft and thereby give the liquid a centrifugal tendency, means for resisting said tendency and means for accommodating the return of the liquid to the center of the casing.

5. A thrust bearing comprising a shaft and a casing containing liquid surrounding the same, a runner within said casing adapted to give said liquid a centrifugal tendency, means for accommodating the return of the liquid to the center, and means for cooling said liquid.

6. A thrust bearing comprising a shaft and a casing surrounding the same, a runner within the casing having its periphery approaching closely to the inner surface of the casing but leaving a contracted passage therebetween, whereby the liquid thrown centrifugally by the runner is forced through said passage, and means for returning said liquid to the center.

7. A thrust bearing comprising a casing and a runner rotating therein, said casing being provided with a chamber surrounding said runner, an air chamber connected to said casing chamber and means to form therein an air cushion.

8. A thrust bearing comprising a shaft and a casing containing liquid surrounding the same, a runner within said casing adapted to give said liquid a centrifugal tendency, means for accommodating the return of the liquid to the center and a water jacket in said casing for cooling said liquid provided with an inlet and an outlet.

9. In a thrust bearing, a shaft, a casing about the shaft provided with a stuffing box having an oil receptacle, a runner within the casing, and a pipe connecting said receptacle to the casing adapted to deliver oil to said receptacle.

10. In a thrust bearing, a shaft, a casing about the shaft, a runner within the casing, provided with a central liquid reservoir surrounding said shaft, there being a space between the sides of the runner and the casing, and the runner provided with radial channels leading from said central reservoir to said spaces adapted to create a liquid pressure in said spaces.

11. In a thrust bearing, a shaft, a casing about the shaft provided with a central liquid reservoir, a runner centrally mounted within said casing leaving a space between the sides thereof, and the casing, said runner being provided with axial and radial channels leading from said central reservoir to said spaces and adapted to create a liquid pressure in said spaces.

In testimony that I claim the foregoing I have hereto set my hand this 25th day of August 1915, in the presence of witnesses.

FERDINAND W. KROGH.

Witnesses:
L. A. ALVES,
R. M. WOLFE.